UNITED STATES PATENT OFFICE.

HERMAN CHARLES WOLTERECK, OF LONDON, ENGLAND, ASSIGNOR TO PERCY MASON, OF LONDON, ENGLAND.

PROCESS OF PRODUCING AMMONIA FROM PEAT.

994,048.  Specification of Letters Patent.  Patented May 30, 1911.

No Drawing.  Application filed December 27, 1910. Serial No. 599,412.

*To all whom it may concern:*

Be it known that I, HERMAN CHARLES WOLTERECK, a subject of the King of Great Britain, residing at London, England, have invented certain new and useful Improvements in Processes of Producing Ammonia from Peat, of which the following is a specification.

My invention relates to the production of ammonia from peat by the moist combustion of the same.

In German Patent No. 175401, granted to my nominees, Gilbert Ward Ireland and Herbert Stanley Sugden in 1903 a process is described for the production of ammonia by the moist combustion of peat within a carefully regulated range of temperature, by means of a variable mixture of air and steam. (British Patent 16,504—1904.) In German Patent No. 220670, granted to my nominees, John Gregory Jones and Pedro Suarez, in 1909, a process is described in which the live steam employed in the process described in the older patent referred to, is nearly or altogether dispensed with, by causing part of the exhaust gases, after the removal of ammonia and other desirable by-products therefrom, to enter the furnace or generator together with the air introduced, for the purposes of the process, below the zone of reaction. (British Patent 27,905—1908.)

According to the process the object of my present application, the process, described in the later patent, is employed with the further modification that the temperature of reaction instead of being controlled so as not to exceed 500° C., is allowed to rise to 600° C., or even to 800° C., without thereby decreasing the yield of ammonia. I obtain this result by mixing with the air introduced into the furnaces or generators, in which the peat is consumed, a sufficiently large quantity of the exhaust gases to considerably reduce the percentage of oxygen contained therein, and thereby, as well as by the presence of the large percentage of carbonic acid (17–18%) contained in the exhaust gases, exert a powerful check on the progress of the combustion taking place. The amount of steam present in the return gases varies greatly during the operation, according to the moisture of the peat employed, the temperature of the outer air and the time of the last charge of one of the furnaces.

On starting the process the temperature in the furnaces is allowed to rise to about 600° C. The admixture of exhaust gases with the air is then maintained by suitable regulating devices in such a manner that the composition of the mixture, as admitted under the grate of the furnaces does not vary beyond: oxygen 8 to 12%, carbonic acid 5 to 14% and carbon monoxid 1 to 2%, calculated on dry gases. With such a mixture the temperature of combustion will hold itself in check and remain within the range of 600° C. to 800° C., and no combustible gases will be produced as would otherwise be expected. The exhaust gases produced by this checked combustion are not combustible, as they contain only about 2.5 to 3% carbon monoxid, 17 to 18% of carbonic acid, below 1% of oxygen and varying by small quantities of hydrogen or hydrocarbons, derived from the destructive distillation of part of the peat in the upper part of the furnaces. The air and exhaust gases must be thoroughly mixed before entering the furnaces, and should be protected as much as possible against loss of heat to prevent an undue condensation of water from the large quantities of steam contained therein. Once the process is fully working the process continues without further attention beyond supplying the peat in the required quantity, and the periodical removal of ashes.

The main object of the present improvement is one of economy, since the employment of a higher range of temperature enables a larger quantity of peat to be consumed in a given time, besides making it possible to use peat with 90% of water, as cut from the bog, though it is more economical to employ peat with a lower percentage, say, 70 to 80%, owing to the otherwise excessive quantities of water to be transported.

I do not broadly claim the production of ammonia from peat by means of the moist combustion of the same in a mixture of air and exhaust gases, but

What I claim is:

In the process for the production of ammonia by passing a mixture of air and steam over heated peat under admixture of a part of the exhaust gases, deprived of ammonia and other required by-products, the reduction of the percentage of oxygen in the gaseous and steam mixture by means of the admixture of such exhaust gases in quantity sufficient to prevent the formation of combustible gases and to maintain the temperature of reaction between 600° C. and 800° C., for the purpose as shown and described.

In testimony whereof I affix my signature in presence of two witnesses.

HERMAN CHARLES WOLTERECK.

Witnesses:
    GEORGE BARNES MARION,
    LOUIS ALBERT GARNER.